United States Patent
Wu et al.

(10) Patent No.: US 11,363,675 B2
(45) Date of Patent: Jun. 14, 2022

(54) MESH NETWORK SYSTEM

(71) Applicant: REALTEK SEMICONDUCTOR CORP., Hsinchu (TW)

(72) Inventors: Jing-Jun Wu, Hsinchu (TW); Cui Ding, Hsinchu (TW); Zuo-Hui Peng, Hsinchu (TW); Zhao-Ming Li, Hsinchu (TW); Guo-Feng Zhang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 133 days.

(21) Appl. No.: 16/996,283

(22) Filed: Aug. 18, 2020

(65) Prior Publication Data
US 2021/0321485 A1    Oct. 14, 2021

(30) Foreign Application Priority Data
Apr. 9, 2020   (CN) .......................... 202010274894.9

(51) Int. Cl.
| | |
|---|---|
| *H04W 84/18* | (2009.01) |
| *H04W 40/24* | (2009.01) |
| *H04W 40/22* | (2009.01) |
| *H04L 45/48* | (2022.01) |

(52) U.S. Cl.
CPC ............ *H04W 84/18* (2013.01); *H04L 45/48* (2013.01); *H04W 40/22* (2013.01); *H04W 40/246* (2013.01)

(58) Field of Classification Search
None
See application file for complete search history.

(56) References Cited

U.S. PATENT DOCUMENTS

| | | | |
|---|---|---|---|
| 10,588,069 B1* | 3/2020 | Chen ....................... | H04L 45/26 |
| 2002/0013856 A1* | 1/2002 | Garcia-Luna-Aceves ................... H04L 45/02 709/230 |
| 2005/0036486 A1* | 2/2005 | Sahinoglu ............. | H04W 40/28 370/389 |

(Continued)

FOREIGN PATENT DOCUMENTS

| | | |
|---|---|---|
| CN | 107231627 A | 10/2017 |
| CN | 107889119 A | 4/2018 |

(Continued)

*Primary Examiner* — Brian S Roberts
(74) *Attorney, Agent, or Firm* — Birch, Stewart, Kolasch & Birch, LLP

(57) ABSTRACT

A mesh network system adapted for a wireless access point includes multiple mesh network nodes, which are a root node, relay nodes, and leaf nodes. The root node is communicatively connected to the wireless access point. The relay nodes and the leaf nodes are configured to receive a downlink message having a downlink destination address. When one of the relay nodes that receives the downlink message determines that the downlink destination address fails to match its mesh network address, the relay node queries a routing table to find a next-hop node address directing to the downlink destination address and forwards the downlink message to the mesh network node corresponding to the next-hop node address. When one of the leaf nodes that receives the downlink message determines that the downlink destination address fails to match its mesh network address, the leaf node discards the downlink message.

10 Claims, 7 Drawing Sheets

(56) References Cited

U.S. PATENT DOCUMENTS

| | | | | |
|---|---|---|---|---|
| 2006/0029060 A1* | 2/2006 | Pister | ............... | H04W 40/00 |
| | | | | 370/389 |
| 2007/0081482 A1 | 4/2007 | Roh et al. | | |
| 2008/0304485 A1* | 12/2008 | Sinha | ............... | H04W 40/246 |
| | | | | 370/392 |
| 2009/0190522 A1* | 7/2009 | Horn | ............... | H04W 40/248 |
| | | | | 370/395.31 |
| 2010/0157889 A1 | 6/2010 | Aggarwal et al. | | |

FOREIGN PATENT DOCUMENTS

| CN | 108156644 A | 6/2018 |
|---|---|---|
| CN | 108199905 A | 6/2018 |
| CN | 108366362 A | 8/2018 |
| CN | 108391238 A | 8/2018 |

* cited by examiner

US 11,363,675 B2

MESH NETWORK SYSTEM

CROSS-REFERENCE TO RELATED APPLICATION

This non-provisional application claims priority under 35 U.S.C. § 119(a) to Patent Application No. 202010274894.9 filed in China, P.R.C. on Apr. 9, 2020, the entire contents of which are hereby incorporated by reference.

BACKGROUND

Technical Field

The present disclosure relates to the network field, and in particular, a mesh network system.

Related Art

Compared with the Internet, a mesh network can create an advantage based on its point-to-point architecture. However, nowadays, a message transmission via the mesh network relies on the Internet Protocol (TCP/IP), so messages transmitted between nodes needs to conform to the Internet protocol. Since the Internet protocol-based messages are widely used in the entire Internet, the message is in a huge size with a complex format. For a single node, transmitting or processing such messages consumes a large amount of resources. That can weaken the point-to-point architecture advantage of the mesh network.

SUMMARY

In view of the above, the present disclosure proposes a mesh network system.

According to some embodiments, a mesh network system adapted for a wireless access point is provided. The mesh network system includes mesh network nodes connected to each other in a tree topology. The mesh network node includes a root node, a plurality of relay nodes, and a plurality of leaf nodes. The root node is communicatively connected to the wireless access point. Each of the mesh network nodes stores a mesh network address, and the root node and each of the relay nodes store a routing table. The relay nodes and the leaf nodes are configured to receive a downlink message, and the downlink message has a downlink destination address. When one of the relay nodes that receives the downlink message determines that the downlink destination address fails to match the mesh network address of its own, the one of the relay nodes queries the routing table of its own to find a next-hop node address directing to the downlink destination address, and the one of the relay nodes forwards the downlink message to the mesh network node corresponding to the next-hop node address. When one of the leaf nodes that receives the downlink message determines that the downlink destination address fails to match the mesh network address of its own, the one of the leaf nodes discards the downlink message.

In summary, in some embodiments, the mesh network system includes mesh network nodes, and each of the mesh network nodes stores a mesh network address. The mesh network node includes a root node, multiple relay nodes, and multiple leaf nodes. The root node and the relay nodes store a routing table. In some embodiments, since the downlink message has a downlink destination address in a mesh network format, the mesh network system can implement a message downlink operation without relying on a message in an Internet protocol format. Therefore, the mesh network system can perform a fast and simplified transmission.

DETAILED DESCRIPTION

Figure 1:
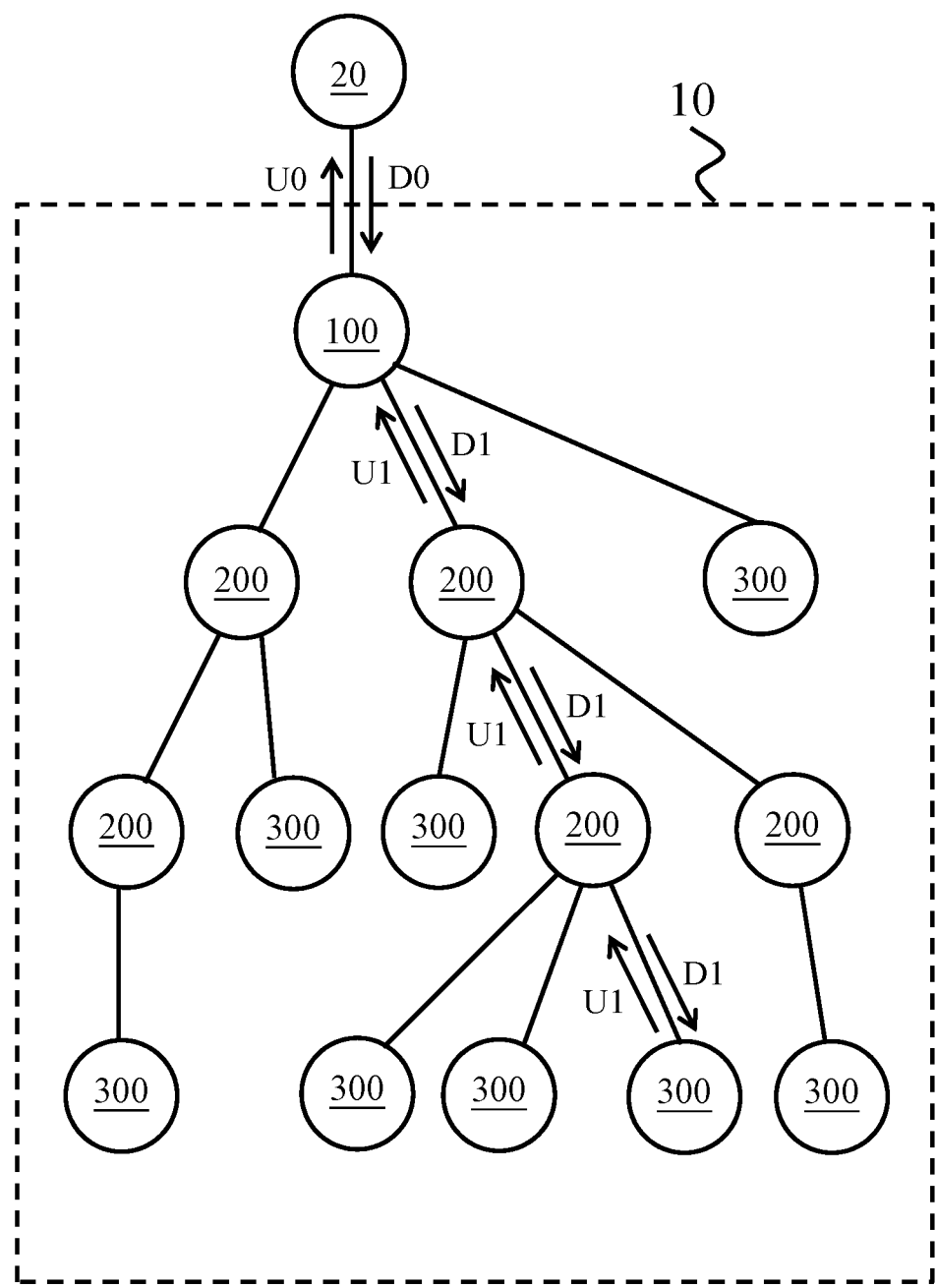
FIG. 1 is a schematic diagram of a mesh network system according to some embodiments of the present disclosure.
Figure 2:
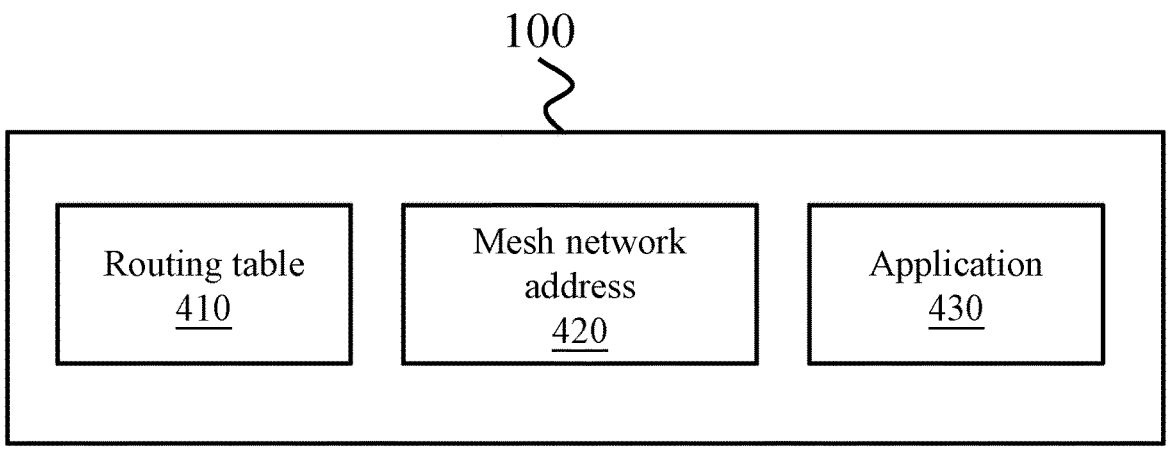
FIG. 2 is a schematic diagram of a root node according to some embodiments of the present disclosure.
Figure 3:
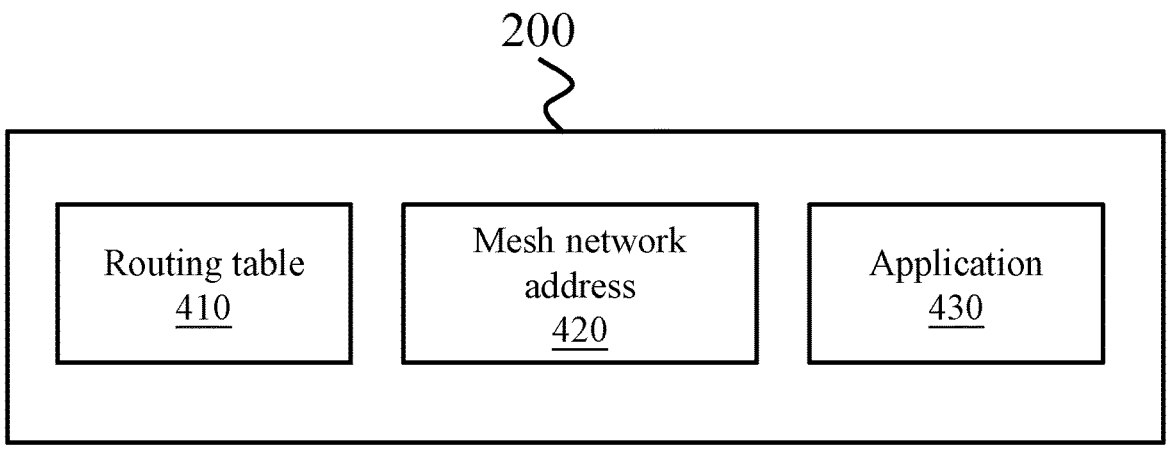
FIG. 3 is a schematic diagram of a relay node according to some embodiments of the present disclosure.
Figure 4:
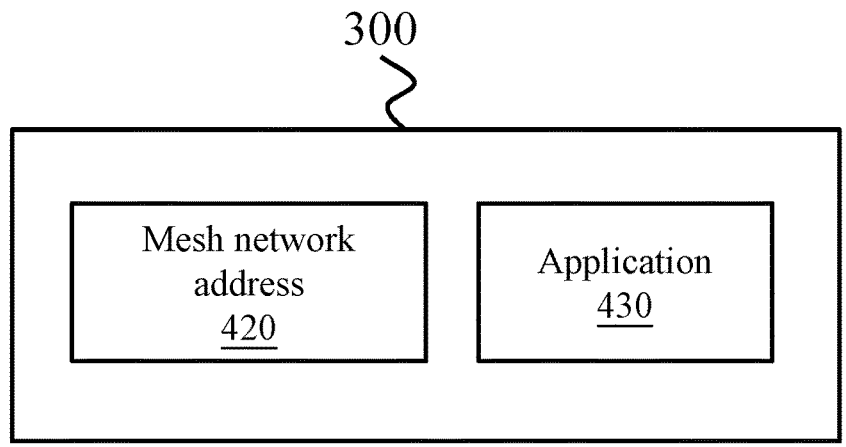
FIG. 4 is a schematic diagram of a leaf node according to some embodiments of the present disclosure.

FIG. 1 is a schematic diagram of a mesh network system 10 according to some embodiments of the present disclosure. FIG. 2, FIG. 3, and FIG. 4 are schematic diagrams of a root node 100, a relay node 200, and a leaf node 300 respectively according to some other embodiments of the present disclosure. Referring to FIG. 1, FIG. 2, FIG. 3, and FIG. 4, in some embodiments, the mesh network system 10 is adapted for a wireless access point 20, that is, the mesh network system 10 is communicatively connected to the wireless access point 20. The mesh network system 10 is also referred to as a mesh wireless (mesh Wi-Fi) network system. The mesh network system 10 includes mesh network nodes connected to each other in a tree topology. The mesh network node includes a root node 100, multiple relay nodes 200, and multiple leaf nodes 300, and the root node 100 is communicatively connected to the wireless access point 20. Each of the mesh network nodes stores a mesh network address 420, and the root node 100 and each of the relay nodes 200 store a routing table 410. As shown in FIG. 2 to FIG. 4, the root node 100 stores a routing table 410 and a mesh network address 420, the relay node 200 stores a routing table 410 and a mesh network address 420, and the leaf node 300 stores a mesh network address 420. The mesh network address 420 is, for example, a media access control address or a local area network address.

Specifically, the mesh network nodes form a mesh network system 10 with a tree topology. Therefore, each of the mesh network nodes corresponds to only one parent node, and may correspond to the same or different parent nodes. In contrast, each of the mesh network node corresponds to one, more than one, or no child nodes. A child node of the root node 100 may be the relay node 200 or the leaf node 300. A parent node of the relay node 200 may be the root node 100 or other relay nodes 200, and a child node of the relay node 200 may be other relay nodes 200 or leaf nodes 300. A parent node of the leaf node 300 may be the root node 100 or the relay node 200, and the leaf node 300 has no child nodes. A path in which the root node 100 is connected downward to any of the leaf nodes 300 in the tree topology may include one or more relay nodes 200, or may include no relay nodes 200.

Referring to FIG. 1, in some embodiments, each of the relay nodes 200 may be configured to receive a downlink message D1. The downlink message D1 has a downlink destination address. In some embodiments, when one of the relay nodes 200 that receives the downlink message D1 determines that the downlink destination address fails to match the mesh network address 420 of its own, this relay nodes 200 queries a routing table 410 of its own to find a next-hop node address directing to the downlink destination address, and this relay nodes 200 forwards the downlink message D1 to the mesh network node corresponding to the next-hop node address.

Specifically, the relay node 200 may receive the downlink message D1 from the root node 100 or other relay nodes 200. Since each of the mesh network nodes has its own mesh network address 420 under the mesh network system 10, and the downlink destination address of the downlink message D1 is identical to the mesh network address 420 of one of the mesh network nodes, the relay node 200 may determine whether the downlink destination address of the downlink message D1 matches its own mesh network address 420. When the relay node 200 determines that the downlink destination address fails to match the mesh network address 420 of its own, the relay node 200 queries the routing table 410 of its own according to the downlink destination address to obtain the next-hop node address. Since the next-hop node address is the mesh network address 420 of another mesh network node, the relay node 200 may forward, according to the next-hop node address, the downlink message D1 to that mesh network node (for example, other relay nodes 200 or leaf nodes 300) based on the next-hop node address.

Referring to FIG. 1, in some embodiments, each of the leaf nodes 300 is configured to receive the downlink message D1. The downlink message D1 has the downlink destination address. In some embodiments, when one of the leaf nodes 300 that receives the downlink message D1 determines that the mesh network address 420 of its own is different from the downlink destination address, the leaf node 300 discards the downlink message D1.

Specifically, since the leaf node 300 has no corresponding child nodes, when the leaf node 300 that receives the downlink message D1 determines that the downlink destination address fails to match the mesh network address 420 of its own, the leaf node 300 cannot forward the downlink message D1 to other mesh network nodes, and therefore the leaf node 300 discards the downlink message D1.

In some embodiments, when one of the relay nodes 200 that receives the downlink message D1 fails to obtain the corresponding next-hop node address by querying the routing table 410, the relay nodes 200 discards the downlink message D1.

Specifically, when the relay node 200 fails to obtain the corresponding next-hop node address by querying the routing table 410 of its own according to the downlink destination address, it indicates that the mesh network node corresponding to the downlink destination address is not a descendant node of the relay node 200 that receives the downlink message D1. Therefore, the relay node 200 discards the downlink message D1. In some embodiments, a method for discarding the downlink message D1 is, for example, deleting the downlink message D1 from the mesh network node (the relay node 200 or the leaf node 300) that receives the downlink message D1.

Referring to FIG. 1, in some embodiments, the leaf node 100 is configured to receive an external downlink message D0 sent by the wireless access point 20. The external downlink message D0 has a downlink destination address. When the root node 100 determines that the downlink destination address fails to match the mesh network address 420 of its own, the root node 100 converts the external downlink message D0 into a downlink message D1. In this way, the downlink message D1 conforms to the mesh network format. Then the root node 100 queries its routing table 410 to find the next-hop node address directing to the downlink destination, and the root node 100 forwards the downlink message D1 to the mesh network node corresponding to the next-hop node address.

Specifically, the downlink destination address of the external downlink message D0 matches the mesh network address 420 of one of the mesh network nodes. Therefore, the root node 100 may determine whether the downlink destination address of the external downlink message D0 is identical to its mesh network address 420. When the root node 100 determines that the downlink destination address fails to match the mesh network address 420 of its own, the root node 100 converts the external downlink message D0 into a downlink message D1, that is, converts the external downlink message D0 into the downlink message D1 conforming to the mesh network format. The downlink destination address of the external downlink message D0 and the downlink destination address of the downlink message D1 direct to the same mesh network node. Then, the root node 100 queries its routing table 410 according to the downlink destination address to obtain the next-hop node address. Since the next-hop node address is also the mesh network address 420 of another mesh network nodes, the root node 100 may forward, according to the next-hop node address, the downlink message D1 to the mesh network node (for example, the relay node 200 or the leaf node 300) corresponding to the next-hop node address.

It should be particularly noted that, in some embodiments, "the downlink message D1 conforms to the mesh network format" means that some or all sections of the downlink message D1 conform to the mesh network format. The description does not intend to limit that all sections of the downlink message D1 are arranged in the mesh network format. In contrast, in some embodiments, the external downlink message D0 conforms to the Internet protocol format.

In some embodiments, when the root node 100 that receives the external downlink message D0 fails to obtain the corresponding next-hop node address by querying the routing table 410 of its own, the root node 100 discards the downlink message D1.

Specifically, when the root node 100 fails to obtain the corresponding next-hop node address by querying its routing table 410 according to the downlink destination address, it indicates that the mesh network node corresponding to the downlink destination address is not a descendant node of the root node 100 receiving the external downlink message D0. Therefore, the relay node 100 discards the downlink message D1. In some embodiments, a method for discarding the downlink message D1 is, for example, deleting the downlink message D1 from the root node 100 receiving the external downlink message D0.

In some embodiments, the root node 100 and the relay nodes 200 may be configured to receive, send, and forward messages, and the leaf nodes 300 may be configured to receive and send messages. Since the leaf nodes 300 are configured without the routing table 410, the leaf nodes 300 may not forward messages. On the contrary, in some embodiments, a leaf node 300 may store a routing table 410 (not shown but the routing table 410 is empty. In this case, when the leaf node 300 is connected downward to other mesh network nodes (for example, an idle node 500 described in the following paragraphs) based on the tree topology, the leaf node 300 may serve as a relay node 200.

In some embodiments, each of the relay nodes 200 may be configured to receive an uplink message U1. The uplink message U1 has an uplink destination address. When one of the relay nodes 200 that receives the uplink message U1 determines that the uplink destination address fails to match the mesh network address 420 of its own, the one of the relay nodes 200 forwards the uplink message U1 to its parent node.

Specifically, the relay node 200 may receive the uplink message U1 from other relay nodes 200 or other leaf nodes 300. The uplink destination address of the uplink message U1 is identical to the mesh network address 420 of one of the mesh network nodes. Therefore, the relay node 200 may determine whether the uplink destination address of the uplink message U1 matches the mesh network address 420 of its own. When the relay node 200 determines that the uplink destination address fails to match the mesh network address 420 of its own, since the relay node 200 has a single parent node, the relay node 200 forwards the uplink message U1 to the parent node (for example, the root node 100 or other relay nodes 200).

In some embodiments, each of the leaf nodes 300 is configured to receive an uplink message U1. The uplink message U1 has an uplink destination address. When one of the leaf nodes 300 that receives the uplink message U1 determines that the uplink destination address fails to match the mesh network address 420 of its own, the one of the leaf nodes 300 forwards the uplink message U1 to its parent node.

Specifically, the leaf node 300 is not limited to obtaining the uplink message U1 from itself or from outside of the mesh network system 10, and the leaf node 300 does not receive the uplink message U1 from other mesh network nodes. The uplink destination address of the uplink message U1 is identical to the mesh network address 420 of one of the mesh network nodes. Therefore, the leaf node 300 may determine whether the uplink destination address of the uplink message U1 matches the mesh network address 420 of its own. When the leaf node 300 determines that the uplink destination address fails to match the mesh network address 420 of its own, since the leaf node 300 has a single parent node, the leaf node 300 forwards the uplink message U1 to that parent node (for example, the root node 100 or the relay node 200).

In some embodiments, the root node 100 is configured to receive an uplink message U1. The uplink message U1 has an uplink destination address. When the root node 100 that receives the uplink message U1 determines that the uplink destination address fails to match the mesh network address 420 of its own, the root node 100 converts the uplink message U1 into an external uplink message U0. In this way, the external uplink message U0 conforms to the Internet protocol format. Then, the root node 100 forwards the external uplink message U0 to the wireless access point 20.

Specifically, the root node 100 may receive the uplink message U1 from the relay node 200 or the leaf node 300. The uplink destination address of the uplink message U1 is identical to the mesh network address 420 of one of the mesh network nodes. Therefore, the root node 100 may determine whether the uplink destination address of the uplink message U1 matches the mesh network address 420 of its own. When the root node 100 determines that the uplink destination address fails to match the mesh network address 420 of its own, the root node 100 converts the uplink message U1 into an external uplink message U0. That is, the root node 100 converts the uplink message U1 into an external uplink message U0 conforming to the Internet format. Then the root node 100 forwards the external uplink message U0 to the wireless access point 20.

It should be particularly noted that, in some embodiments, "the external uplink message U0 conforms to the Internet format" means that some or all sections of the external uplink message U0 conform to the Internet protocol format. The description does not intend to limit that all sections of the external uplink message U0 are arranged in the Internet protocol format. In contrast, in some embodiments, the uplink message U1 conforms to the mesh network format.

Referring to FIG. 1, FIG. 2, FIG. 3, and FIG. 4, in some embodiments, each of the mesh network nodes further stores an application 430. That is, each of the root node 100, each of the relay nodes 200, and each of the leaf nodes 300 further store an application 430 respectively. When one of the relay nodes 200 (or one of the leaf nodes 300) that receives the downlink message D1 determines that the downlink destination address matches the mesh network address 420 of its own, the one of the relay nodes 200 processes the downlink message D1 according to the application 430 that it stores. For example, the downlink message D1 may have instructions with destinations of the relay node 200 or the leaf node 300, and the application 430 of the relay node 200 or the leaf node 300 may perform operations, calculations or other functions according to the instructions wrapped in the downlink message D1.

In some embodiments, when the root node 100 that receives the external downlink message D0 determines that the downlink destination address matches the mesh network address 420 of its own, the root node 100 processes the external downlink message D0 according to its application 430. For example, the external downlink message D0 may have instructions with a destination of the root node 100, and the application 430 of the root node 100 may perform operations, calculations or other functions according to the instructions wrapped in the external downlink message D0. The application 430 is, for example, an application programming interface or a mobile application.

Referring to FIG. 1, FIG. 2, FIG. 3, and FIG. 4, in some embodiments, each of the mesh network nodes (including the root node 100, each of the relay node 200, and each of the leaf node 300) is configured to receive an uplink message U1. The uplink message U1 has an uplink destination address. When the mesh network node that receives the uplink message U1 determines that the uplink message U1 matches a mesh network address 420 of its own, the mesh network node processes the uplink message U1 according to its application 430. For example, the uplink message U1 may have instructions with a destination of a specific mesh network node, and the application 430 of the specific mesh network node may perform operations, calculations or other functions according to the instructions wrapped in the uplink message U1.

In some embodiments, the mesh network node may execute its application 430 to obtain the uplink message U1 or the downlink message D1.

Figure 5:
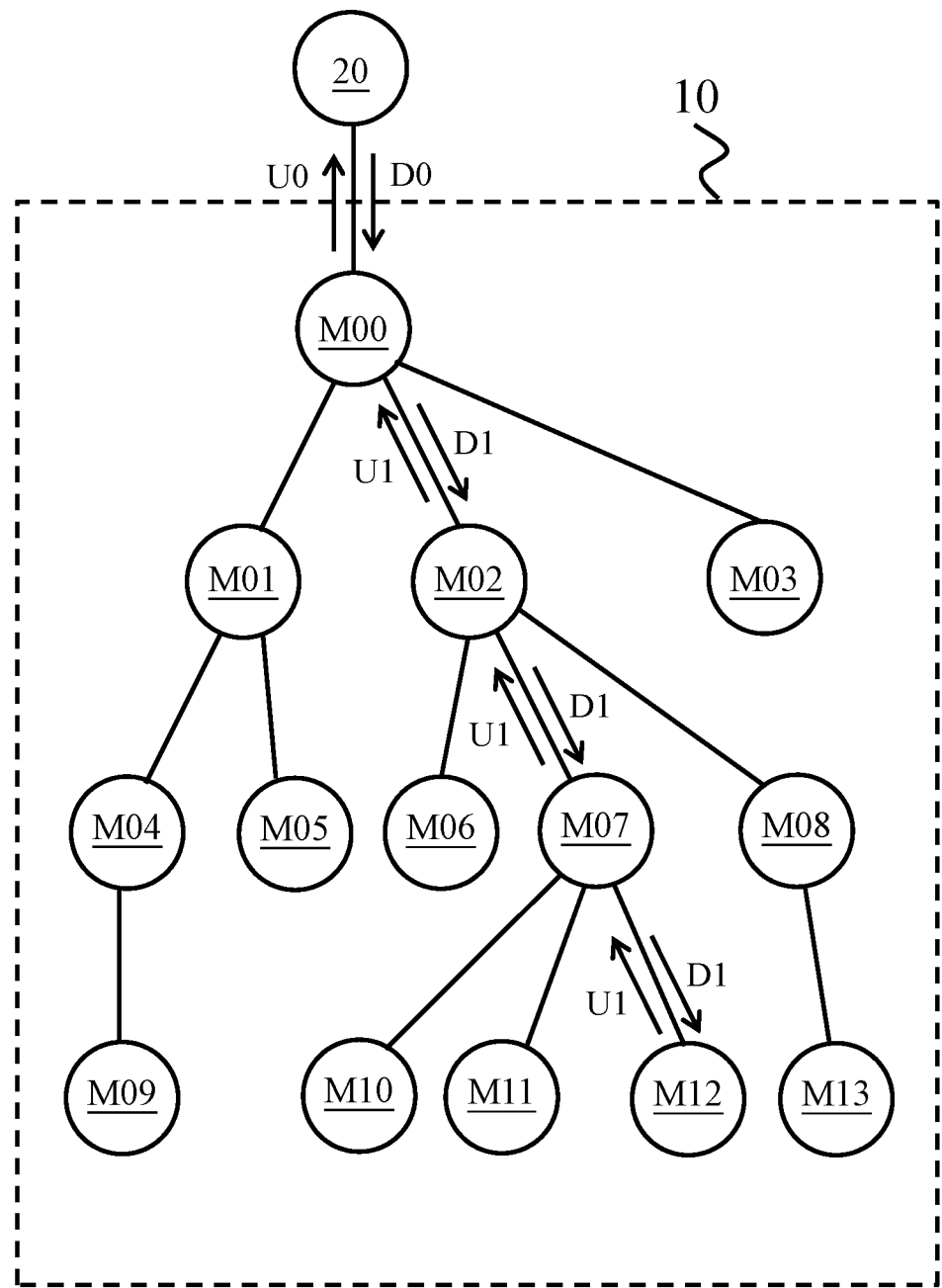
FIG. 5 is a schematic diagram of a mesh network address of a mesh network system according to some embodiments of the present disclosure.

FIG. 5 is a schematic diagram of a mesh network address 420 of a mesh network system 10 according to some embodiments of the present disclosure. Referring to FIG. 5, in some embodiments, the mesh network system 10 includes mesh network nodes M00-M13. The mesh network node M00 is a root node 100, the mesh network nodes M01, M02, M04, M07, and M08 are relay nodes 200, and the mesh network nodes M03, M05, M06, M09, M10, M11, M12, and M13 are leaf nodes 300.

In some embodiments, any of the mesh network nodes (for example, any of the mesh network nodes M00, M01, M02, M04, M07, and M08) that store the routing table 410 may be a routing node. Each of the routing node may correspond to multiple next-hop nodes and multiple descendant nodes. The next-hop node is a mesh network node to which the routing node is directly connected along a downward direction in the tree topology. The descendant node is a mesh network node to which the routing node is directly or indirectly connected along the downward direction in the tree topology. Specifically, the next-hop nodes are the child nodes of the routing node, and the descendant nodes are the child nodes or the grandchild nodes of the routing node. In other words, the descendant nodes of the routing node includes the next-hop nodes of the routing node. For example, the next-hop nodes of the mesh network node M00 include the mesh network nodes M01-M03, and the descendant nodes of the mesh network node M00 include the mesh network nodes M01-M13. Therefore, the mesh network nodes M01-M03 are both the next-hop nodes and the descendant nodes of the mesh network node M00. The next-hop node of the mesh network node M02 includes the mesh network nodes M06-M08, and the descendant node of the mesh network node M02 includes the mesh network nodes M06-M08 and M10-M13. Therefore, the mesh network nodes M06-M08 are both the next-hop nodes and the descendant nodes of the mesh network node M02.

Figure 6:
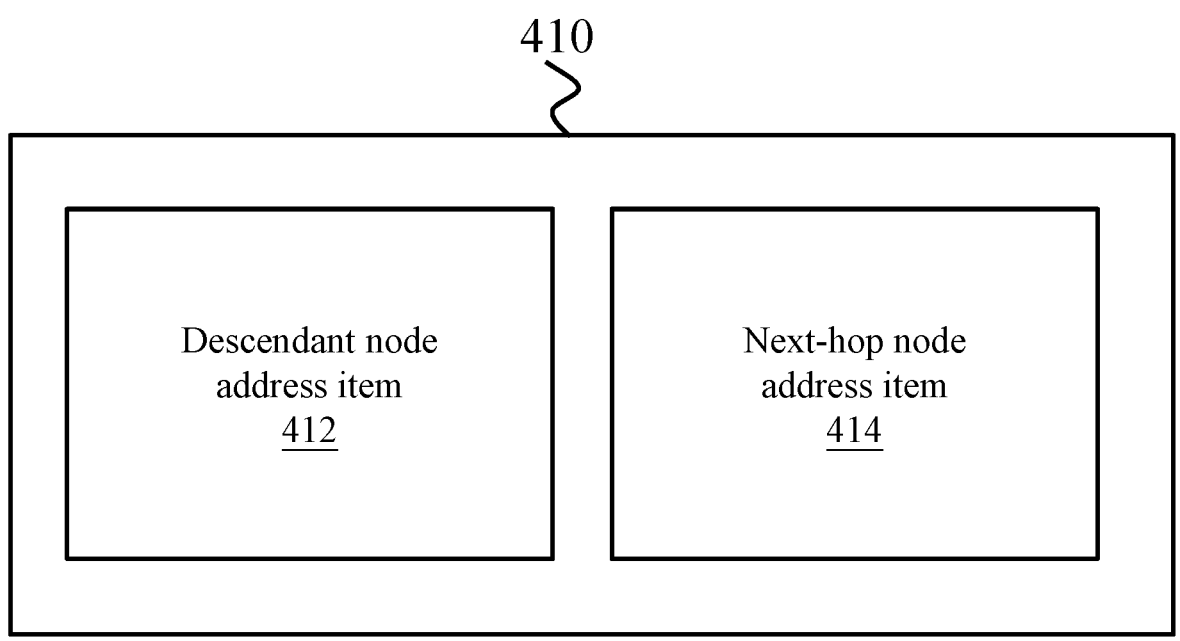
FIG. 6 is a schematic diagram of a routing table according to some embodiments of the present disclosure.

FIG. 6 is a schematic diagram of a routing table 410 according to some embodiments of the present disclosure. Referring to FIG. 5 and FIG. 6, in some embodiments, the routing table 410 stored in the routing node includes a descendant node address item 412 and a next-hop node address item 414. The descendant node address item 412 includes information regarding the mesh network addresses 420 of each descendant node, and the next-hop node address item 414 includes information regarding the mesh network addresses 420 of the next-hop nodes connected to each descendant node. In the tree topology, the next-hop node is a mesh network node located on a path extending from a specific routing node to one of its descendant nodes and directly connected to this routing node.

More specifically, the descendant node address item 412 is a collection of the mesh network addresses 420 of the routing node's descendant nodes. The next-hop node address item 414 is a collection of the mesh network addresses 420 of the next-hop nodes. The next-hop nodes are the descendant nodes of the routing node. For example, in a case that the routing node is the mesh network node M00 and the descendant node address item 412 indicates the mesh network address 420 of the mesh network node M07, the next-hop node address item 414 directs to the mesh network address 420 of the mesh network node M02. To explain that, the next-hop node (M02) meets both of the two aforementioned conditions: firstly, the next-hop node (M02) is located on a path (M0-M2-M7) extending from the routing node (M00) to the descendant node (M07) in the tree topology; and secondly, the next-hop node (M02) is a descendant node (M01 or M02) in direct connection with the routing node (M00) in the tree topology. Therefore, if the descendant node being indicated is the mesh network node M07, the mesh network node M02 is the one that meets the conditions of the next-hop node. Therefore, the mesh network node M02 is selected as the next-hop node.

In some embodiments, if the routing node is the mesh network node M00, the routing table 410 of the mesh network node M00 may be shown in the following Table 1.

TABLE 1

| Descendant node address item 412 | Next-hop node address item 414 |
|---|---|
| MAC-01 | MAC-01 |
| MAC-02 | MAC-02 |
| MAC-03 | MAC-03 |
| MAC-04 | MAC-01 |
| MAC-05 | MAC-01 |
| MAC-06 | MAC-02 |
| MAC-07 | MAC-02 |
| MAC-08 | MAC-02 |
| MAC-09 | MAC-01 |
| MAC-10 | MAC-02 |
| MAC-11 | MAC-02 |
| MAC-12 | MAC-02 |
| MAC-13 | MAC-02 |

In a case that the routing node is the mesh network node M00 and the mesh network address 420 of the descendant node (M12) indicates "MAC-12", the selected next-hop node (M02) has the mesh network address 420 of "MAC-02".

In some embodiments, if the routing node is the mesh network node M02, the routing table 410 of the mesh network node M02 may be shown in the following Table 2.

TABLE 2

| Descendant node address item 412 | Next-hop node address item 414 |
|---|---|
| MAC-06 | MAC-06 |
| MAC-07 | MAC-07 |
| MAC-08 | MAC-08 |
| MAC-10 | MAC-07 |
| MAC-11 | MAC-07 |
| MAC-12 | MAC-07 |
| MAC-13 | MAC-08 |

In a case that the routing node is the mesh network node M02 and the mesh network address 420 of the descendant node (M12) indicates "MAC-12", the selected next-hop node (M07) has the mesh network address 420 of "MAC-07".

In some embodiments, if the routing node is the mesh network node M07, the routing table 410 of the mesh network node M07 may be shown in the following Table 3.

TABLE 3

| Descendant node address item 412 | Next-hop node address item 414 |
|---|---|
| MAC-10 | MAC-10 |
| MAC-11 | MAC-11 |
| MAC-12 | MAC-12 |

In a case that the routing node is the mesh network node M07 and the mesh network address 420 of the descendant node (M12) is "MAC-12", the selected next-hop node (M12) has the mesh network address 420 of "MAC-12".

In some embodiments, the mesh network address of the mesh network node M00 is "MAC-00". The mesh network node M00 (the root node 100) receives an external downlink message D0 sent by the wireless access point 20. A downlink destination address of the external downlink message D0 indicates "MAC-12". The mesh network node M00 determines that the downlink destination address "MAC-12" fails to match the mesh network address "MAC-00" of its own, so the mesh network node M00 converts the external downlink message D0 into a downlink message D1. The mesh network node M00 queries its routing table 410 (i.e., Table 1). Since the downlink destination address "MAC-12" matches "MAC-12" in the descendant node address item 412, and a next-hop node address item 414 corresponding to "MAC-12" is "MAC-02", the mesh network node M00 forwards the downlink message D1 to the mesh network node M02 (one of the relay node 200) corresponding to the next-hop node address "MAC-02".

Accordingly, the mesh network node M02 (the relay node 200) receives the downlink message D1 sent by the mesh network node M00 (the root node 100). The downlink destination address of the downlink message D1 indicates "MAC-12". Since the mesh network node M02 determines that the downlink destination address "MAC-12" fails to match the mesh network address "MAC-02" of its own, the mesh network node M02 queries its routing table 410 (i.e., Table 2). Since the downlink destination address "MAC-12" matches "MAC-12" in the descendant node address item 412, and a next-hop node address item 414 corresponding to "MAC-12" is "MAC-07", the mesh network node M02 forwards the downlink message D1 to the mesh network node M07 (another relay node 200) corresponding to the next-hop node address "MAC-07". Similarly, after receiving the downlink message D1, the mesh network node M07 (the relay node 200) obtains a next-hop node address "MAC-12" by querying its table. Therefore, the mesh network node M07 forwards the downlink message D1 to a mesh network node M12 (the leaf node 300) corresponding to the next-hop node address "MAC-12".

In some embodiments, the mesh network node M12 (the leaf node 300) sends an uplink message U1 to the mesh network node M07 (a parent node of the mesh network node M12). The uplink message U1 indicates an uplink destination address "MAC-99". The mesh network node M07 determines that the uplink destination address "MAC-99" fails to match the mesh network address "MAC-07" of its own and forwards the uplink message U1 to the mesh network node M02 (a parent node of the mesh network node M07). Similarly, the mesh network node M02 determines that the uplink destination address "MAC-99" fails to match the mesh network address "MAC-02" of its own and forwards the uplink message D1 to the mesh network node M00 (the parent node of the mesh network node M02). The mesh network node M00 (the root node 100) determines that the uplink destination address "MAC-99" fails to match the mesh network address "MAC-00" of its own and converts the uplink message U1 into an external uplink message U0, then the mesh network node M00 forwards the external uplink message U0 to the wireless access point 20.

Figure 7:
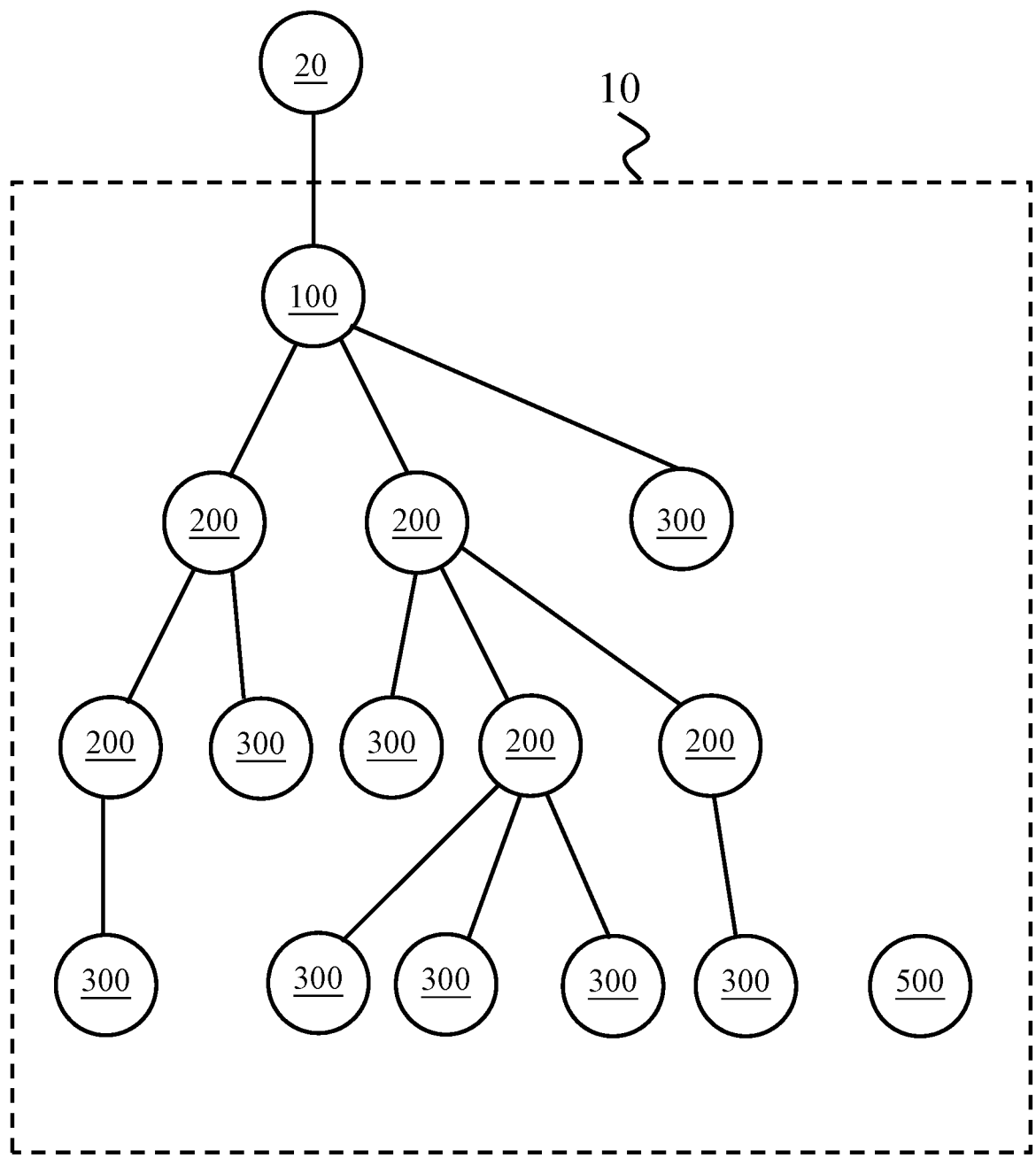
FIG. 7 is a schematic diagram of an idle node according to some embodiments of the present disclosure.
Figure 8:
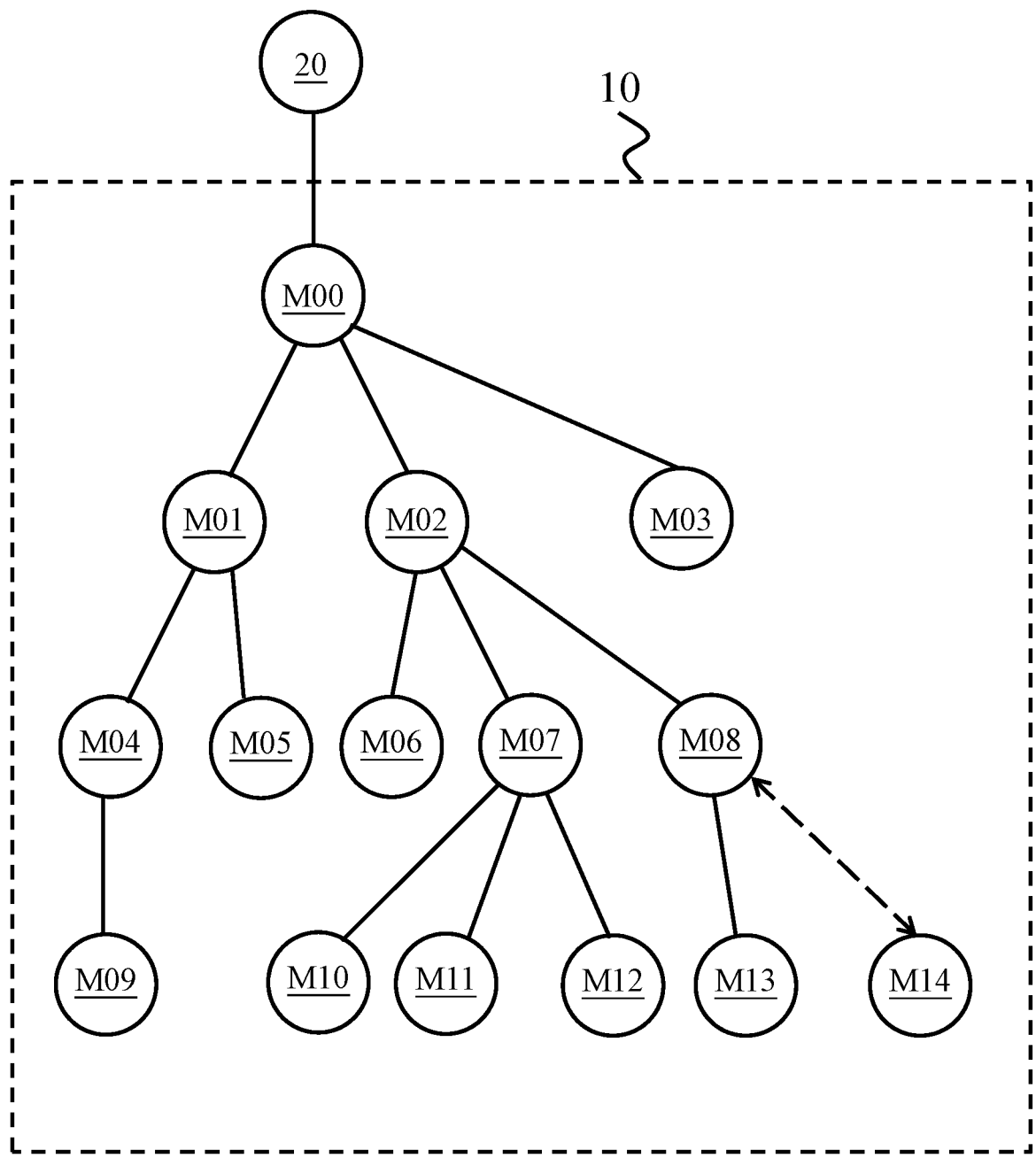
FIG. 8 is a schematic diagram of a mesh network address of a mesh network system according to some other embodiments of the present disclosure.

FIG. 7 is a schematic diagram of an idle node 500 according to some embodiments of the present disclosure. FIG. 8 is a schematic diagram of a mesh network address 420 of a mesh network system 10 according to some other embodiments of the present disclosure. Referring to FIG. 7 and FIG. 8, in some embodiments, the mesh network system 10 may further include an idle node 500. Specifically, the idle node 500 is a mesh network node not being connected to other mesh network nodes in the tree topology. After the idle node 500 is directly connected to one of the routing nodes (for example, any of the mesh network nodes M00, M01, M02, M04, M07, and M08) in the tree topology, the routing node updates its routing table 410 to add a mesh network address of the idle node 500 into the descendant node address item 412 and the next-hop node address item 414. The routing node may correspond to a plurality of ancestor nodes. The ancestor node is a mesh network node to which the routing node is directly or indirectly connected along an upward direction in the tree topology (for example, in a case that the routing node is the mesh network node M08, the ancestor nodes may be the mesh network nodes M02 and M00). Each of the ancestor nodes of the routing node updates its routing table 410 to add the mesh network address 420 of the idle node 500 into the descendant node address item 412 and add the mesh network address 420 of a next-hop node corresponding to the idle node 500 to the next-hop node address item 414.

In some embodiments, after the idle node 500 (i.e., the mesh network node M14) is directly connected to one of the routing nodes (e.g., the mesh network node M08) in the tree topology, the mesh network node M08 updates its routing table 410. An updated section of the routing table 410 may be shown in the following Table 4.

TABLE 4

| Descendant node address item 412 | Next-hop node address item 414 |
|---|---|
| MAC-14 (added) | MAC-14 (added) |

The updated section of the routing table 410 includes "MAC-14" being illustrated in the descendant node address item 412 and "MAC-14" being illustrated in the next-hop node address item 414. That is, the mesh network node M08 updates its routing table 410 of regarding the new child node (i.e., the mesh network node M14) being connected to the mesh network.

In some embodiments, after the idle node 500 (i.e., the mesh network node M14) is directly connected to one of the routing nodes (i.e., the mesh network node M08) in the tree topology, the mesh network node M02 updates its routing table 410 since the mesh network node M02 is an ancestor node (a parent node) of the mesh network node M08. An updated section of the routing table 410 may be shown in the following Table 5.

TABLE 5

| Descendant node address item 412 | Next-hop node address item 414 |
|---|---|
| MAC-14 (added) | MAC-08 (added) |

The updated section of the routing table 410 includes "MAC-14" being illustrated in the descendant node address item 412 and "MAC-08" being illustrated in the next-hop node address item 414. That is, the mesh network node M02 updates its routing table 410 regarding a new descendent node (i.e., the mesh network node M14) being connected to the mesh network.

In some embodiments, after the idle node 500 (i.e., the mesh network node M14) is directly connected upward to one of the routing nodes (i.e., the mesh network node M08) in the tree topology, the mesh network node M00 updates its routing table 410 since the mesh network node M00 is an ancestor node (a parent node of the parent node) of the mesh network node M08. An updated section of the routing table 410 may be shown in the following Table 6.

TABLE 6

| Descendant node address item 412 | Next-hop node address item 414 |
|---|---|
| MAC-14 (added) | MAC-02 (added) |

The updated section of the routing table 410 includes "MAC-14" being illustrated in the descendant node address item 412 and "MAC-02" being illustrated in the next-hop node address item 414. That is, the mesh network node M00 updates its routing table 410 regarding a new descendent node (the mesh network node M14) being connected to the mesh network.

In some embodiments, after the idle node 500 is directly connected along an upward direction to one of the routing nodes in the tree topology, all the ancestor nodes of the routing node update their routing tables 410. Such update ends at the root node 100. For example, in a case that the idle node 500 becomes the mesh network node M14 and the routing node it connects to is the mesh network node M08, the routing table updates end at the mesh network node M00 (i.e., the root node 100). Alternatively, assuming that the wireless access point 20 has a routing table 410 (not shown in the figure), even if the wireless access point 20 is directly connected to the root node 100, the wireless access point 20 does not update its routing table 410.

Figure 9:
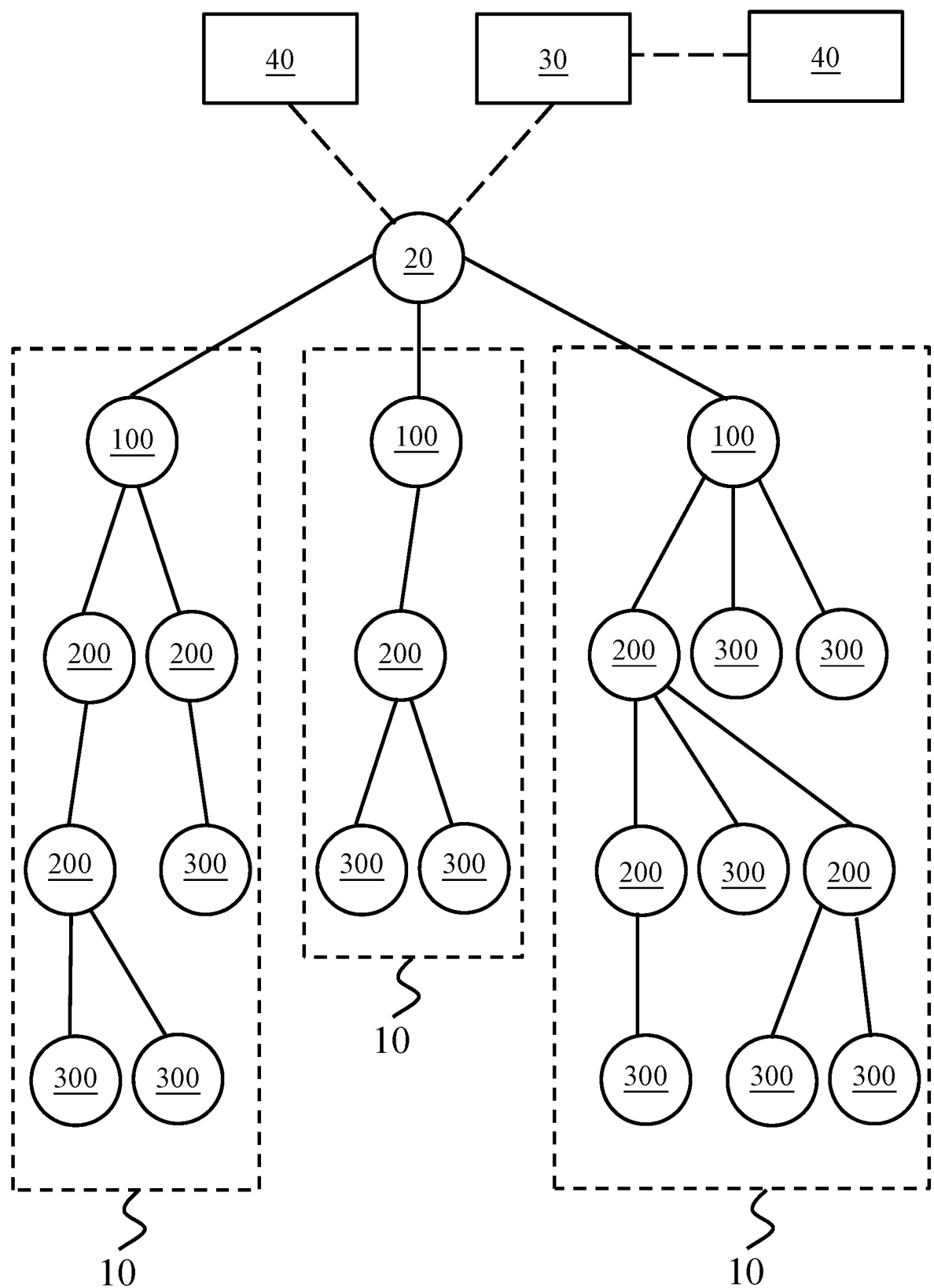
FIG. 9 is a schematic diagram of a mesh network system according to some other embodiments of the present disclosure.

FIG. 9 is a schematic diagram of a mesh network system 10 according to some other embodiments of the present disclosure. Referring to FIG. 9, in some embodiments, the mesh network system 10 is communicatively connected to a cloud network 30 through the wireless access point 20 and indirectly connected to an external electronic apparatus 40 through the cloud network 30. Alternatively, the mesh network system 10 may be directly connected to the external electronic apparatus 40 through the wireless access point 20. A mesh network node may be, for example, an Internet of Things (IOT) apparatus or other electronic apparatuses with a network connecting capability. The wireless access point 20 may be, for example, a wireless network router, a wireless base station, or an electronic apparatus (such as a mobile phone) with a hotspot function. The external electronic apparatus 40 may be, for example, a mobile phone, a desktop computer, a tablet, or other electronic apparatuses with a network connecting function. It is particularly noted that one wireless access point 20 is not limited to being communicatively connected to a single mesh network system 10 or a plurality of mesh network systems 10. A mesh network system 10 is not limited to being communicatively connected to a single wireless access point 20 or a plurality of different wireless access points 20. However, the mesh network system 10 can remain communicatively connected to the cloud network 30 or the external electronic apparatus 40 through a single wireless access point 20 at one time point.

In summary, in some embodiments, the mesh network system includes mesh network nodes, and each of the mesh network nodes stores a mesh network address. The mesh network node includes a root node, multiple relay nodes, and multiple leaf nodes. The root node and the relay nodes store a routing table. In some embodiments, since the downlink message and the uplink message have a destination address in a mesh network format, the mesh network system can implement a message downlink operation or a message uplink operation without relying on a message in an Internet protocol format. Therefore, the mesh network system can perform a fast and simplified transmission.

What is claimed is:

1. A mesh network system adapted for a wireless access point, wherein the mesh network system comprises:
   a plurality of mesh network nodes connected to each other in a tree topology, wherein the mesh network nodes comprises:
   a root node communicatively connected to the wireless access point;
   a plurality of relay nodes; and
   a plurality of leaf nodes;
   wherein each of the mesh network nodes stores a mesh network address, and the root node and each of the relay nodes store a routing table;
   wherein the relay nodes and the leaf nodes are configured to receive a first downlink message having a first downlink destination address;
   wherein when one of the relay nodes that receives the first downlink message determines that the first downlink destination address fails to match the mesh network address of its own, the one of the relay nodes queries the routing table of its own to find a first next-hop node address directing to the first downlink destination address, and the one of the relay nodes forwards the first downlink message to the mesh network node corresponding to the first next-hop node address; and
   wherein when one of the leaf nodes that receives the first downlink message determines that the first downlink destination address fails to match the mesh network address of its own, the one of the leaf nodes discards the first downlink message.

2. The mesh network system according to claim 1, wherein when one of the relay nodes that receives the first downlink message fails to obtain the first next-hop node address by querying the routing table of its own, the one of the relay nodes discards the first downlink message.

3. The mesh network system according to claim 1,
   wherein the root node is configured to receive an external downlink message sent by the wireless access point;
   wherein the external downlink message has a second downlink destination address; and
   wherein when the root node determines that the second downlink destination address fails to match the mesh network address of its own, the root node converts the external downlink message into a second downlink message conforming to a mesh network format, the root node queries the routing table of its own to find a second next-hop node address directing to the second downlink destination address according to the second downlink address, and the root node forwards the second downlink message to the mesh network node corresponding to the second next-hop node address.

4. The mesh network system according to claim 3, wherein the root node further stores an application, and when the root node determines that the second downlink destination address matches the mesh network address of its own, the root node processes the external downlink message according to the application of its own.

5. The mesh network system according to claim 1,
   wherein each of the relay nodes and each of the leaf nodes further store an application, respectively;
   wherein when one of the relay nodes that receives the first downlink message determines that the first downlink destination address matches the mesh network address of its own, the one of the relay nodes processes the first downlink message according to the application of its own; and
   wherein when one of the leaf nodes that receives the first downlink message determines that the first downlink destination address matches the mesh network address of its own, the one of the leaf nodes processes the first downlink message according to the application of its own.

6. The mesh network system according to claim 1,
wherein each of the relay nodes or each of the leaf nodes has a parent node, and the parent node is one of the mesh network nodes being directly connected to the relay node or the leaf node along an upward direction in the tree topology;

wherein the relay nodes and the leaf nodes are configured to receive an uplink message having an uplink destination address;

wherein when one of the relay nodes that receives the uplink message determines that the uplink destination address fails to match the mesh network address of its own, the one of the relay node forwards the uplink message to the parent node of its own; and wherein when one of the leaf nodes that receives the uplink message determines that the uplink destination address fails to match the mesh network address of its own, the one of the leaf nodes forwards the uplink message to the parent node of its own.

7. The mesh network system according to claim 1, wherein the root node is configured to receive an uplink message having an uplink destination address, wherein when the root node that receives the uplink message determines that the uplink destination address fails to match the mesh network address of its own, the root node converts the uplink message into an external uplink message conforming to an Internet protocol format, and the root node forwards the external uplink message to the wireless access point.

8. The mesh network system according to claim 1,
wherein each of the mesh network nodes further stores an application and is configured to receive an uplink message having an uplink destination address; and wherein when one of the mesh network nodes that receives the uplink message determines that the uplink destination address matches the mesh network address of its own, the one of the mesh network nodes processes the uplink message according to the application of its own.

9. The mesh network system according to claim 1, wherein any of the mesh network nodes with the routing table is defined as a routing node, the routing node corresponds to a plurality of next-hop nodes and a plurality of descendant nodes, the next-hop nodes are the mesh network nodes to which the routing node is directly connected along a downward direction in the tree topology, the descendant nodes are the mesh network nodes to which the routing node is directly or indirectly connected along the downward direction in the tree topology, and the routing table stored in the routing node comprises:

a descendant node address item comprising the mesh network address of each of the descendant nodes; and a next-hop node address item comprising the mesh network address of the next-hop node corresponding to each of the descendant nodes, wherein the next-hop node is located on a path extending from the routing node to the descendant node along the downward direction in the tree topology, and the next-hop node is one of the descendant nodes to which the routing node is directly connected in the tree topology.

10. The mesh network system according to claim 1, further comprising an idle node, wherein each of the routing tables comprises a descendant node address item and a next-hop node address item;

wherein any of the mesh network nodes with the routing table is defined as a routing node, the routing node corresponds to a plurality of ancestor nodes, and the ancestor nodes are the mesh network nodes to which the routing node is directly or indirectly connected along an upward direction in the tree topology; and wherein after the idle node is directly connected to one of the routing nodes along the upward direction in the tree topology, the one of the routing node updates the routing table of its own to add the mesh network address of the idle node into the descendant node address item and the next-hop node address item, and each of the ancestor nodes updates the routing table of its own to add the mesh network address of the idle node into the descendant node address item and add the mesh network address of the next-hop node corresponding to the idle node to the next-hop node address item.

* * * * *